United States Patent Office 2,894,049
Patented July 7, 1959

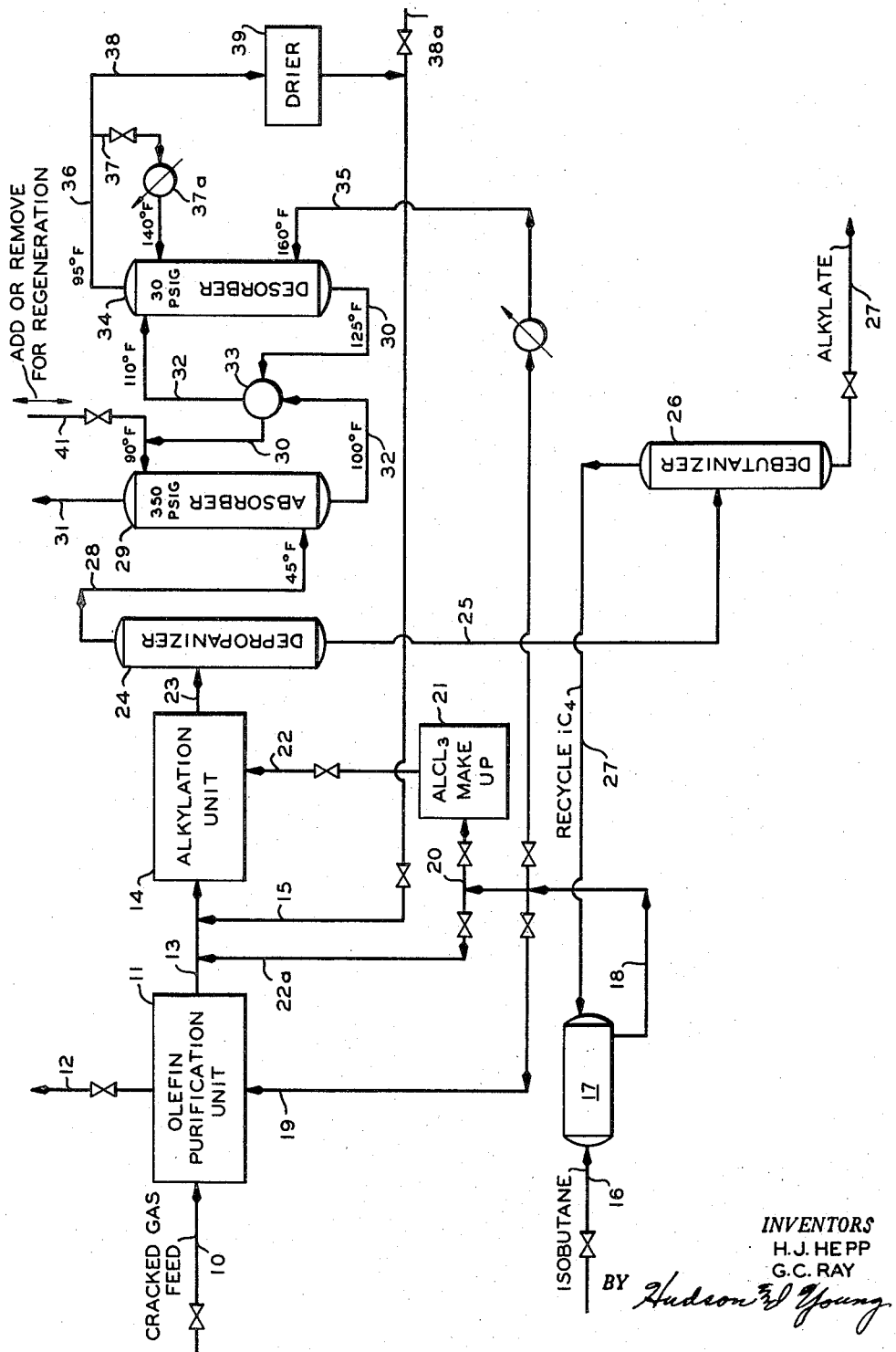

2,894,049

PROCESS FOR THE RECOVERY OF OLEFIN HYDROCARBONS

Gardner C. Ray and Harold J. Hepp, Bartlesville, Okla., assignors to Phillips Petroleum Company, a corporation of Delaware Application June 10, 1955, Serial No. 514,506

10 Claims. (Cl. 260—677)

This invention relates to a process for the recovery of a normally gaseous olefin, such as ethylene, from an admixture with at least one saturated light hydrocarbon by absorption in an aqueous solution of a copper salt-reagent such as copper nitrate-monoethanolamine. A specific aspect of the invention relates to the desorption of ethylene from solution in an aqueous solution of copper nitrate-monoethanolamine. Another specific aspect of the invention pertains to the alkylation of an alkylatable hydrocarbon, such as isobutane, with an olefin, such as ethylene, and recovery of the unreacted olefin and/or paraffin.

Light olefins, particularly ethylene, are important chemical raw materials which are used in the chemical and petrochemical industries for manufacture and synthesis of numerous products. One use of these olefins is in the catalytic alkylation of alkylatable hydrocarbons, such as paraffins, to produce more valuable hydrocarbons for use in such motor fuels as aviation gasoline. An important source of ethylene is from the cracking of hydrocarbons such as $C_2$—$C_4$ paraffins. In obtaining ethylene from admixture with other hydrocarbons, such as found in a cracked gas stream, it is conventional to dissolve the ethylene in an aqueous solution of a cuprous salt and ammonia or an amine, e.g., orthophenetidine. It has been found that one of the most effective solutions for absorption of ethylene is a cuprous salt, particularly copper nitrate, dissolved in aqueous monoethanolamine. In recovering the absorbed ethylene from such solutions, the conventional practice is to subject the rich solution to pressure reduction and heating to desorb the ethylene from the solution. We have found that heating a cuprous salt-monoethanolamine solution to temperatures above about 140° F. at which desorption is most readily effected causes rather rapid deterioration of the solution for absorption of ethylene and that maintaining the desorption temperature not in excess of 140° F. and, preferably, about 125° F. is conducive to extremely long life of the absorbing solution. This deterioration is the result of the instability of the cuprous salt solution at such elevated temperatures. We have devised a process for desorption of olefin-rich cuprous salt-monoethanolamine solutions which greatly retards deterioration of the solution but which is highly effective in recovering the olefin therefrom.

This invention is principally concerned with an improved process for recovering normally gaseous olefins from cuprous salt complexes at sufficiently low temperatures that copper and copper-sludge deposition does not occur to any appreciable degree, the improvement comprising stripping the absorbed gaseous olefin, especially ethylene, from a cuprous salt reagent, preferably cuprous nitrate-ethanolamine, at a temperature in the range of about 30° to 140° F. with isobutane. In a preferred embodiment, the process comprises the steps of absorbing unreacted ethylene in the effluent from a diisopropyl (DIP) alkylation unit with cuprous nitrate-monoethanolamine in aqueous solution at a temperature in the range of 100 to 130° F., desorbing the ethylene from the cuprous nitrate-ethanolamine complex by stripping with isobutane at a temperature in the range of 120 to 130° F., while controlling the flow rate of isobutane to effect a mol ratio of isobutane to ethylene in the effluent in the range of 3:1 to 10:1, and passing the recovered ethylene and isobutane effluent as part of the feed to the DIP alkylation unit.

The utilization of cuprous salts dissolved in a suitable liquid medium such as, for example, aqueous organic bases or aqueous $NH_3$ in processes for the recovery of normally gaseous olefin hydrocarbons, particularly ethylene and propylene, from gaseous hydrocarbon streams containing them is not new. In these processes the olefins are dissolved in the cuprous reagent principally by formation of a soluble coordination complex with cuprous ions. The recovery of the olefin from the complex is usually effected by subjecting the olefin-containing solution to at least one of the steps of pressure reduction or heating to cause liberation of the dissolved olefin. Liberation of the olefins regenerates the cuprous salt solution which may then be reused to absorb olefins from a fresh portion of the olefin-containing stream.

A particularly suitable cuprous reagent for such processes are solutions of cuprous nitrate in aqueous monoethanolamine. However, when this reagent is heated to temperatures sufficiently high to desorb essentially all of the olefins from the complex, reactions occur which eventually lead to the deposition of metallic copper, and in some cases, deposition of copper-containing sludge. The various degradation reactions resulting are very undesirable, especially since the deposits formed foul various pieces of plant equipment such as pumps, transfer lines, bubble trays, and the like. Further, since loss of copper to deposits depletes the liquid reagent of copper, this reagent gradually loses capacity for absorbing olefins. A temperature above 140° F. is required to essentially quantitatively desorb ethylene from cuprous nitrate-ethanolamine reagents at an ethylene partial pressure of one atmosphere in the gas phase contacting the reagent. At these temperatures the rate of copper deposition is appreciable; however, at temperatures of 140° F., or lower, this reagent is relatively stable to copper deposition for sufficiently long periods of time to make it practical for utilization in commercial operations.

The principal object of the invention is to provide an improved process for recovering an absorbed olefin from a cuprous salt reagent in aqueous solution which materially retards deterioration of the solution. Another object is to provide an improved process for the recovery of absorbed ethylene from an aqueous solution of copper nitrate and monoethanolamine at temperatures at which copper and copper sludge deposition does not occur. Another object is to provide an improved process for recovering a normally gaseous olefin from admixture with light saturated hydrocarbons. Another object of the invention is to provide a process for recovering ethylene from admixture with normally gaseous paraffins such as methane, ethane, and propane with or without hydrogen in the mixture. A further object is to provide an improved process for recovering a normally gaseous olefin from an alkylation effluent. It is also an object of the invention to provide an improved process for alkylating an alkylatable hydrocarbon with a normally gaseous olefin. Another object is to provide an improved process for recovering olefins in an especially desirable admixture suitable for alkylation. Other objects of the invention will become apparent from a consideration of the accompanying disclosure.

In accordance with the present invention, we provide an efficient, practical, and convenient method of recovering gaseous olefins from a cuprous salt-monoethanolamine complex at sufficiently low temperatures that copper and copper-sludge deposition does not occur at a rapid enough rate to present a serious problem and subsequently utilizing the recovered olefins in the recovered admixture to advantage. Broadly, the process of the present invention comprises stripping the absorbed gaseous olefins from a cuprous salt-monoethanolamine reagent at temperatures not in excess of 140° F. with a normally gaseous hydrocarbon material non-reactive to and relatively insoluble in the cuprous salt-ethanolamine reagent and subsequently utilizing the olefin-stripping gas mixture as an alkylation feed. Cuprous salts that can be employed in the present invention include the nitrate, chloride, acetate, formate, carbonate, oxalate, benzoate, benzolsulfonate, anthranalate, salicylate, and the like; however, cuprous nitrate is most suitable. In a preferred embodiment, we strip the absorbed olefin, preferably ethylene, from a cuprous nitrate-monoethanolamine solution with an isoparaffin, preferably isobutane, and then pass the off-gas from the stripper as part of the feed to a DIP alkylation unit.

A more complete understanding of our invention will be obtained by reference to the accompanying schematic drawing which shows a preferred embodiment of the process. The practice of our invention is illustrated in connection with the reaction of isobutane with ethylene to produce diisopropyl.

Referring now to the drawing, a cracked gas mixture containing both saturated and unsaturated normally gaseous hydrocarbons obtained from a source not shown is passed through line 10 to olefin purification unit 11 which may be a fractionating column. In olefin purification unit 11 an ethylene-rich fraction is separated from methane, $CO_2$, hydrogen, and other gases, which are removed through line 12, and passed via line 13 to alkylation unit 14. An ethylene-isobutane stream obtained from a source to be described later is introduced into line 13 via line 15. Isobutane obtained from a suitable source not shown is passed via line 16 to surge tank 17. Isobutane to be used in the alkylation unit and as stripping gas is removed from tank 17 via line 18, a portion of the isobutane being passed through line 19 to olefin purification unit 11 where it serves as reflux and from which it passes, along with the ethylene-containing feed, through line 13 to the alkylation unit 14. Another portion of the isobutane is either passed through line 20 to $AlCl_3$ make-up unit 21 and subsequently through line 22 to alkylation unit 14 or is passed through line 22a to line 13 and subsequently to the alkylation unit. It is also feasible to pass isobutane through each of lines 20 and 22a.

The reaction temperature maintained in alkylation unit 14 ranges between about 50 and about 200° F., preferably about 80 and about 150° F. The catalyst employed is preferably a hydrocarbon-aluminum halide complex, which can be supported on a suitable carrier, if desired. The volume ratio of hydrocarbons to catalyst in the reaction zone ranges between about 9:1 and 1:1, and preferably in a ratio of 3:2. It is preferred to operate the alkylation unit under sufficient pressure to maintain liquid phase conditions within the reactor. The amount of ethylene charged to the alkylator which undergoes reaction is preferably above 80 percent and is more desirably about 90 to 95 percent but it should not be allowed to extend above about 97 to 98 percent. The mol ratio of isobutane to ethylene is maintained in the range of 3:1 to 10:1.

The hydrocarbon reaction mixture and catalyst are intimately contacted in alkylator 14 and a mixture of hydrocarbons and catalyst is withdrawn and passed to a settler (not shown). In the settler a heavy catalyst phase settles out and is recycled to the alkylator. A hydrocarbon phase is removed from the settler and passed through line 23 to depropanizer 24. This stream always contains ethylene when operating under the preferred conditions discussed above. A butane and heavier fraction is removed from depropanizer 24 via line 25 and passed to debutanizer 26, wherein alkylate product is removed as bottoms through line 27 and isobutane is removed overhead and recycled through line 27 to surge tank 17.

The overhead fraction removed from depropanizer 24 via line 28 comprises principally ethane and ethylene and is passed to absorber 29. The $C_2$ fraction is introduced near the bottom of absorber 29 and rises countercurrently to a cuprous nitrate-monoethanolamine solution admitted via line 30. The ethylene is thereby absorbed at elevated pressure in the cuprous nitrate-monoethanolamine solution, and the denuded gas, in this case, ethane and lighter, is discharged by vent pipe 31 from the top of absorber 29. Operating conditions in absorber 29 include a temperature from just above the freezing point of the solution to about 140° F. and a partial pressure of ethylene in the range of 1 lb. to 100 lbs., it being preferred to operate at a temperature not in excess of 125° F. and above about 60° F. and at a partial pressure of ethylene in the range of 15 to 90 lbs.

The enriched cuprous nitrate-monoethanolamine solution is withdrawn from the bottom of absorber 29 and passed via line 32 through heat exchanger 33 to the top of desorber 34 through which it passes downwardly countercurrently to a stream of isobutane supplied from line 35. The isobutane strips the absorbed ethylene from the cuprous nitrate-ethanolamine solution and a mixture of isobutane and ethylene is taken overhead via line 36. A portion of the overhead fraction removed from desorber 34 is recycled to the column through line 37 and heat exchanger 37a so as to provide additional heat to the column. Conditions maintained in desorber or stripper 34 include a temperature in the range of 80 to 140° F. and a pressure in the range of 0.1 to 4 atmospheres absolute. The preferred temperature utilized is in the range of 100 to 130° F., while the preferred pressure is in the range of 1 to 2 atmospheres.

The isobutane-ethylene fraction removed overhead from the desorber, minus that recycled to the column, is passed through line 38 to drier 39, and then recycled through line 15 to alkylation unit 14. Where desired any portion of the isobutane-ethylene effluent may be removed through line 38a for separation of these components and recovery of the same. The lean cuprous nitrate-ethanolamine solution is withdrawn from the bottom of desorber 34 via line 30 and passed through heat exchanger 33 and is then returned to the top of absorber 29.

Line 41 serves to withdraw solution for regeneration or replacement as well as to reintroduce solution to the system. For efficient operation the copper content calculated as $Cu^+$ and $Cu^{++}$ should be maintained in the range of 8 to 15 weight percent and more desirably in the range of 10 to 12 percent. In order to avoid copper deposition it is essential to maintain at least a small amount of $Cu^{++}$ in the solution.

EXAMPLE I

Table I presents data illustrating the stability of cuprous chloride-monoethanolamine solutions containing approximately 10–12 weight percent total $Cu^+$ and $Cu^{++}$. The life of the solution is defined as the length of time required to initiate deposition of metallic copper (this is coincident with a reduction of $Cu^{++}$ content to zero). The life of the solution seems to be independent of the initial $Cu^{++}$ concentration, at least in the range of 0.5 to 2 percent initial $Cu^{++}$. As can be seen from Table I cuprous chloride-ethanolamine solutions are quite unstable when heated to temperatures above about 140° F. The thermal stabilities of cuprous nitrate and cuprous chloride solutions are very similar with approximately the same concentrations of copper, and the data in Table I are representative of either of the two reagents.

Table I
LIFE OF SOLUTION

| | |
|---|---|
| 176° F. | 1 day. |
| 158° F. | 6 days. |
| 140° F. | 21 days. |
| 77° F. | At least 9 months. |

EXAMPLE II

This example illustrates the use of $CH_4$ to desorb ethylene from a CuCl-ethanolamine solution. At 77° F. a sample of 19.3 cc. of CuCl reagent containing 14.16 wt. percent Cu+ was dissolved in 153.7 standard cc. of ethylene at 760 mm. pressure. By addition of 40.8 standard cc. of $CH_4$, thus changing the equilibrium partial pressure of ethylene to 525 mm., ethylene was desorbed to the extent that only 109.6 standard cc. remained in solution. Calculations from the equilibrium constant showed that at an equilibrium ethylene partial pressure of 525 mm. 110.3 standard cc. of ethylene should have remained in solution. This is a check within 0.6 percent. The use of an inert desorbing gas other than $CH_4$, e.g., isobutane, should effect similar results.

When operating at the temperatures and pressures indiacted on the drawing, which represent desired operating conditions, various stream compositions and flow rates obtained are presented in Table II.

Table II
STREAM COMPOSITION, MOLS/DAY

| Stream No. | 13 | 28 | 38 | 37 | 35 | 20 | 19 | 16 | 30 |
|---|---|---|---|---|---|---|---|---|---|
| $H_2$ | 9 | 9 | | | | | | | |
| $C_1$ | 368 | 368 | | | | | | | |
| $C_2^=$ | 1,360 | 136 | 133 | 453 | | | | | |
| $C_2$ | 421 | 334 | | | | | | | |
| $C_3^=$ | 440 | | | | | | | | |
| $C_3$ | 107 | 50 | | | | | | | |
| i-$C_4$ | 1,034 | 103 | 547 | 1,865 | 547 | 3,700 | 1,034 | 1,800 | |
| | 3,739 | 1,000 | 680 | 2,318 | 547 | 3,700 | 1,034 | 1,800 | |
| (Gal./D.) | | | 35,520#/D. | 121,000#/D. | (6,800) | (44,000) | (12,400) | (21,500) | (22,000) |

NOTE.—Stream 38 contains about 24 g./d.$H_2O$.

EXAMPLE III

Several runs were made in stripping ethylene from a $CuNO_3$-monoethanolamine solution with isobutane, the solution being saturated with ethylene at one atmosphere of pressure. A one inch I.D. column packed to a height of 45 inches with 0.11" x 0.11" ceramic packing of the approximate shape of Raschig rings was utilized with the liquid feed being introduced to the top of the column and gaseous isobutane at the bottom. Isobutane and stripped ethylene were removed from the top of the column and lean solvent was removed from the bottom of the column. Column temperature was maintained at about 25° C. and about 744 mm. pressure. The results obtained are presented in Table III.

Table III
ISOBUTANE STRIPPING OF ETHYLENE FROM $CuNO_3$-MEA SOLUTION

| Run No. | Gaseous Isobutane Feed Rate (25° C.— 720 mm.), cc./min. | Liquid Feed Rate, cc./min. | Percent $C_2H_4$ in Effluent | Percent $C_2H_4$ Desorbed | Liquid Feed Comp.[1] |
|---|---|---|---|---|---|
| 1 | 344 | 25 | 29.6 | 39.2 | 14.7 |
| 2 | 528 | 25 | 23.4 | 43.9 | 14.7 |
| 3 | 340 | 14 | 24.6 | 49 | 16.1 |
| 4 | 554 | 13 | 17.1 | 55 | 16.1 |

[1] Feed composition in standard cc. $C_2H_4$/cc. $CuNO_3$-MEA solution.

Certain modifications of the invention will become apparent to those skilled in the art and the illustrative details disclosed are not to be construed as imposing unnecessary limitations on the invention.

We claim:

1. A process for the recovery of a normally gaseous olefin from an aqueous solution comprising a copper salt-monoethanolamine complex and said olefin which comprises intimately contacting said solution with a gaseous saturated hydrocarbon inert under the conditions of contacting at a pressure not above 4 atmospheres absolute and at an elevated temperature not above 130° F. at which deposition of metallic copper is substantially avoided; and recovering a gaseous effluent comprising said olefin and said hydrocarbon.

2. A process for the recovery of ethylene from an aqueous solution comprising a copper nitrate-monoethanolamine complex and said ethylene which comprises intimately contacting said solution with gaseous isobutane at a pressure not substantially above 4 atmospheres absolute and at an elevated temperature not above 130° F. at which deposition of metallic copper is substantially avoided; and recovering a gaseous effluent comprising said ethylene and said isobutane.

3. The process of claim 2 wherein the amount of isobutane passed to said contacting is regulated so as to produce a mixture of isobutane and ethylene suitable for alkylation and including the step of passing said mixture to a catalytic alkylation zone maintained under alkylating conditions so as to alkylate same.

4. A process for recovery of a normally gaseous olefin from a hydrocarbon feed containing said olefin, said feed being free of CO, acetylene, and material other than said olefin which react with an aqueous solution of copper salt-monoethanolamine, which comprises contacting said feed with said solution at an elevated temperature and pressure so as to selectively absorb said olefin from said feed while avoiding deposition of copper from said solution; recovering an olefin-rich solution from said contacting and passing same into contact with a gaseous saturated hydrocarbon of less than 6 carbon atoms per molecule at an elevated temperature not above 130° F. and a pressure not above 3 atmospheres so as to desorb said olefin and recover same in said saturated hydrocarbon.

5. The process of claim 4 wherein said olefin comprises ethylene, said solution comprises copper nitrate-monoethanolamine, and said saturated hydrocarbon comprises isobutane.

6. The process of claim 5 wherein said feed comprises at least a portion of the effluent from an alkylation process in which isobutane is alkylated in an alkylation zone with ethylene, and including the steps of regulating the amount of isobutane passed to the desorption step so as to maintain the mol ratio of isobutane to ethylene in the effluent in the range of 3:1 to 10:1, and passing resulting isobutane-olefin effluent to said alkylation zone as a portion of the feed thereto.

7. A process for recovery of ethylene from an effluent hydrocarbon stream from an alkylation zone in which isobutane is alkylated with ethylene so as to leave ethylene in said effluent, which comprises separating from said effluent a $C_2$ and lighter fraction containing most of the ethylene therein; passing said $C_2$ and lighter fraction to an absorption zone and contacting same therein with an aqueous solution of copper nitrate-monoethanolamine at a temperature in the range of 60 to 140° F. and at an elevated pressure so as to absorb in said solution a major portion of the ethylene from said stream; passing the resulting ethylene-containing solution to a desorption zone and contacting same therein with gaseous isobutane at an elevated temperature not above 130° F. and at a pressure below that maintained in said absorption zone so as to desorb a major portion of the ethylene therein; regulating the amount of isobutane fed to said desorption zone so as to maintain a ratio of isobutane to ethylene in the effluent therefrom in the range of 3:1 to 10:1; and passing resulting isobutane-ethylene effluent from said desorption zone to said alkylation zone as feed thereto.

8. The process of claim 7 including the steps comprising passing the heavier fraction remaining from separating $C_2$ and lighter to a separation zone and recovering the major portion of isobutane therefrom; passing a portion of the recovered isobutane to said alkylation zone together with ethylene; and passing another portion of the recovered isobutane to said desorption zone.

9. A process for the recovery of ethylene from an aqueous solution comprising a copper nitrate-monoethanolamine complex and said ethylene which comprises intimately contacting said solution with gaseous isobutane at a pressure not above 4 atmospheres absolute and at an elevated temperature in the range from 100 to 130° F. at which deposition of metallic copper is substantially avoided; and recovering a gaseous effluent comprising said ethylene and said isobutane.

10. A process for recovery of ethylene from an effluent hydrocarbon stream from an alkylation zone in which isobutane is alkylated with ethylene so as to leave ethylene in said effluent; which comprises separating from said effluent a $C_2$ and lighter fraction containing most of the ethylene therein; passing said $C_2$ and lighter fraction to an absorption zone and contacting same therein at a temperature in the range of 60 to 130° F. with an aqueous solution of copper nitrate-monoethanolamine and at an elevated pressure, the partial pressure of ethylene being in the range of 15 to 90 p.s.i.g., so as to absorb in said solution a major portion of the ethylene from said stream; passing the resulting ethylene-containing solution to a desorption zone and contacting same therein with gaseous isobutane at an elevated temperature in the range of 100 to 130° F. and at a pressure substantially below that maintained in said absorption zone and in the range of atmospheric to 45 p.s.i.g. so as to desorb a major portion of the ethylene therein; regulating the amount of isobutane fed to said desorption zone so as to maintain a ratio of isobutane to ethylene in the effluent therefrom in the range of 3:1 to 10:1; and passing resulting isobutane-ethylene effluent from said desorption zone to said alkylation zone as feed thereto, while recycling a portion of the said isobutane-ethylene effluent to said desorption zone so as to control the temperature therein.

References Cited in the file of this patent

UNITED STATES PATENTS

| | | |
|---|---|---|
| 2,005,500 | Joshua et al. | June 18, 1935 |
| 2,376,239 | Evans et al. | Mar. 15, 1945 |
| 2,589,960 | Ray | Mar. 18, 1952 |